(12) United States Patent
Zhang et al.

(10) Patent No.: US 10,941,333 B2
(45) Date of Patent: Mar. 9, 2021

(54) HEAVY OIL ACTIVATOR AND PREPARATION METHOD AND USE THEREOF

(71) Applicants: CHINA NATIONAL OFFSHORE OIL CORPORATION, Beijing (CN); CNOOC RESEARCH INSTITUTE CO., LTD., Beijing (CN)

(72) Inventors: Jian Zhang, Beijing (CN); Yuejun Zhu, Beijing (CN); Xiaodong Kang, Beijing (CN); Guang Yang, Beijing (CN); Xudong Wang, Beijing (CN); Engao Tang, Beijing (CN); Xiujun Wang, Beijing (CN)

(73) Assignees: CHINA NATIONAL OFFSHORE OIL CORPORATION, Beijing (CN); CNOOC RESEARCH INSTITUTE CO., LTD., Beijing (CN)

( * ) Notice: Subject to any disclaimer, the term of this patent is extended or adjusted under 35 U.S.C. 154(b) by 0 days.

(21) Appl. No.: 16/743,828

(22) Filed: Jan. 15, 2020

(65) Prior Publication Data

US 2020/0199442 A1 Jun. 25, 2020

Related U.S. Application Data

(63) Continuation of application No. PCT/CN2018/075360, filed on Feb. 6, 2018.

(30) Foreign Application Priority Data

Aug. 4, 2017 (CN) .................. 201710659444.X
Aug. 4, 2017 (CN) .................. 201710659447.3

(51) Int. Cl.
*C09K 8/588* (2006.01)
*C08F 283/06* (2006.01)
*E21B 43/16* (2006.01)

(52) U.S. Cl.
CPC .......... *C09K 8/588* (2013.01); *C08F 283/065* (2013.01); *E21B 43/16* (2013.01)

(58) Field of Classification Search
None
See application file for complete search history.

(56) References Cited

U.S. PATENT DOCUMENTS

| 2010/0029880 A1* | 2/2010 | Zhang | .................. C09K 8/584 |
|---|---|---|---|
| | | | 526/287 |
| 2013/0017239 A1* | 1/2013 | Viladot Petit | .......... A61K 8/342 |
| | | | 424/401 |
| 2014/0350204 A1* | 11/2014 | Wang | .................. C04B 24/2688 |
| | | | 526/263 |

FOREIGN PATENT DOCUMENTS

| CN | 107383273 | 11/2017 |
|---|---|---|
| CN | 107446563 | 12/2017 |

OTHER PUBLICATIONS

International search report dated May 9, 2018 from corresponding application No. PCT/CN2018/075360.

(Continued)

*Primary Examiner* — Jeffrey D Washville
(74) *Attorney, Agent, or Firm* — Hauptman Ham, LLP (57) ABSTRACT

Disclosed are a heavy oil activator, a preparation method and use thereof. The heavy oil activator has a structural formula shown in Formula (1). In Formula (1), x, y, z, m, and n are respectively mass fractions of corresponding chain segments in the polymer, m being 0.75-0.85, y being 0.20-0.24, and x, z, and n all being 0.001-0.01; and p is a natural number between 2 and 9. The activating polymer provided has the effects of increasing viscosity of an aqueous phase while reducing viscosity of crude oil, and can serve both as a displacing agent and a viscosity reducer to realize integration of the two agents. The activating polymer can increase viscosity of an aqueous phase, has a displacement effect, can (Continued)

emulsify and disperse crude oil, and increase fluidity of a mixed phase; the dispersed crude oil continues to interact with crude oil that has not contacted the polymer, and the aqueous phase interacts with the mixed oil phase as well as new oil, by way of which continuous interactions, more crude oil can be constantly produced. The activating polymer has a relatively low interfacial tension and exhibits a certain degree of oil washing capability.

13 Claims, 4 Drawing Sheets

(56) References Cited

OTHER PUBLICATIONS

Yang et al., "Influence of Amphiphilic Polymer Functional Monomer on Aggregation and Interface Behavior", Journal of Southwest Petroleum University (Science & Technology Edition), vol. 39 No. Jun. 3, 2017, pp. 180-187.
Office Action dated Mar. 1, 2019 and English translation from corresponding application No. CN 201710659447.3.
Office Action dated May 8, 2019 and English translation from corresponding application No. CN 201710659447.3.
Office Action from corresponding application No. CN 201710659447.3.

\* cited by examiner

Dispersity of crude oil achieved by the activating polymer

Dispersity of crude oil achieved by the small molecule viscosity reducer

HEAVY OIL ACTIVATOR AND PREPARATION METHOD AND USE THEREOF

PRIORITY CLAIM

The present application is a continuing application of PCT Patent Application No. PCT/CN2018/075360, filed Feb. 6, 2018, and claims the priority of China Application No. 201710659444.X, filed Aug. 4, 2017, and China Application No. 201710659447.3, filed Aug. 4, 2017, the entirety of which are hereby incorporated by reference.

FIELD OF THE INVENTION

The present invention relates to a heavy oil activator, a preparation method and use thereof, and belongs to the field of oilfield development.

BACKGROUND OF THE INVENTION

Heavy oil is much more difficult to exploit than conventional crude oil due to its high content of resins and asphaltenes as well as its high viscosity. At present, conventional heavy oil production techniques mainly include approaches such as viscosity reduction by heating, viscosity reduction by dilution, viscosity reduction by hydrothermal cracking, viscosity reduction by microbes, chemical viscosity reduction, etc. Principles of these approaches are to reduce the viscosity of heavy oil and increase its fluidity by raising the temperature of heavy oil, light crude oils of same structure dissolving each other, catalytic cracking of heavy oil under high-temperature steam, subjecting heavy oil to microbial degradation, and by a chemical viscosity reducer, respectively, to realize effective production of heavy oil.

However, current heavy oil production techniques all have certain limitations. The method of viscosity reduction by heating (thermal production) is complicated in process, high in energy consumption, and has problems such as sand production in oil layers, gas channeling, high oil production cost, etc. At the same time, ground conditions and reservoir conditions in thermal production are strictly limited by screening standards of the thermal production method. For example, heavy oil reservoirs with relatively deep depth or thin thickness are not suitable for thermal production. The dilution method requires consumption of thin oil resources, but the reserves of thin crude oil are limited and output thereof is showing a decreasing trend, and there is bound to be the situation that no thin oil can be used for mixing. The method of viscosity reduction by hydrothermal cracking requires that the catalyst be a liquid or a nano-scale water-soluble suspension, be highly temperature-resistant and basically harmless to human bodies and the environment, which makes it difficult to realize large-scale promotion and application of the production technique of viscosity reduction by catalytic cracking in a short period of time. Limitations of the method of viscosity reduction by microbes is that microbes are easily destroyed under oil reservoir conditions of high temperature, high salinity and high content of heavy metal ions, and surfactants and biopolymers produced by microbes may possibly cause sedimentation themselves. Besides, conditions for cultivating microbes are difficult to grasp. Chemical viscosity reduction refers to a method in which a certain chemical agent is added to heavy oil to reduce the viscosity of crude oil by the action of the chemical agent. A chemical agent applicable to any crude oils and capable of reducing the viscosity under any conditions has not yet been found. Therefore, it is only possible to adopt different chemical viscosity reduction measures for crude oils having different properties and for different oil well production conditions. Commonly used viscosity reduction methods include a viscosity reduction technique of adding an oil-soluble viscosity reducer, and a viscosity reduction technique of adding an emulsifier. Although there are many formulations for emulsifying viscosity reducers, there are still many problems. For example, the liquid produced by using them is difficult to treat, and their selectivity to heavy oil is very high because of the great difference in the composition of heavy oil. How does the composition of heavy oil affect the viscosity reduction effect achieved by emulsification, and how does the structure of an emulsifying viscosity reducer be related to its properties. There are currently not many emulsifying viscosity reducers that can be used under high-temperature and high-salinity reservoir conditions. Even if there are related reports in the literature, most of them are costly.

With the development of oilfield, it has become more and more difficult to achieve the goal of reducing viscosity and improving the overall benefit of oilfield by conventional viscosity reduction techniques alone. It is therefore of great practical significance to study unconventional chemical viscosity reduction techniques suitable for the development mode of heavy oil reservoirs based on the conventional chemical viscosity reduction techniques.

SUMMARY OF THE PRESENT INVENTION

The objective of the present invention is to provide a heavy oil activator which can increase the viscosity of aqueous phase, and have a displacement function. The heavy oil activator can emulsify and disperse crude oil, and increase the fluidity of a mixed phase. Besides, the dispersed crude oil continues to interact with crude oil that has not contacted the heavy oil activator, and the aqueous phase interacts not only with the mixed oil phase but also with new oil. Production efficiency at oilfields can thus be enhanced.

The activating water polymer provided by the present invention has a structural formula shown in Formula (1):

(Formula 1)

wherein, in Formula (1), x, y, z, m, and n are respectively mass fractions of corresponding chain segments in the activating water polymer, m being 0.75-0.85, y being 0.20-0.24, and x, z, and n all being 0.001-0.01; and p is a natural number between 2 and 9.

In Formula (1), m is preferably 0.8, y is preferably 0.2, x is preferably 0.005, z is preferably 0.003, and n is preferably 0.002.

The present invention further provides a preparation method of the activating water polymer, which comprises the following steps:

subjecting acrylamide, a functional monomer I, a functional monomer II, and a functional monomer III to a free radical polymerization reaction in an inert atmosphere, in presence of an initiator, and under an alkaline condition, to obtain the activating water polymer;

the functional monomer I has a structural formula as shown in Formula (2), Formula (2)

wherein in Formula (2), p is a natural number between 2 and 9;

the functional monomer II has a structural formula as shown in Formula (3).

Formula (3)

the functional monomer III has a structural formula as shown in Formula (4);

Formula (4)

In the above preparation method, the method is carried out according to the following steps:

adding acrylamide, the functional monomer I, the functional monomer II, and the functional monomer III to water to obtain a reaction solution, adjusting a pH value of the reaction solution, and then introducing nitrogen into the reaction solution; lowering temperature of the reaction solution using an ice brine bath, and then adding the initiator to carry out the free radical polymerization reaction; wherein heat released by the free radical polymerization reaction raises the temperature of the reaction system, and after the temperature of the reaction system reaches a highest point, the free radical polymerization reaction is continued for 2-6 hours.

In the above preparation method, the pH value is adjusted to 7-11 by using sodium carbonate.

In the above preparation method, the temperature of the reaction solution is lowered to 6-15° C. using the ice brine bath.

In the above preparation method, the highest temperature reached by the reaction system is 25-40° C.

In the above preparation method, adding amounts of the functional monomer I, the functional monomer II, and the functional monomer III by mass are respectively 0.02-0.2%, 0.02-0.4%, and 0.01-0.5% of an adding amount of acrylamide by mass, and may particularly be 0.04%, 0.04%, and 0.03%, respectively, of the adding amount of acrylamide by mass.

In the system of the free radical polymerization reaction, a total mass concentration of the reactive monomers is 25-30%, the total mass concentration of the monomers referring to a sum total of acrylamide, the functional monomer I, the function monomer II, and the functional monomer III.

In the above preparation method, the initiator is a mixture of ammonium persulfate, potassium persulfate, sodium hydrogen sulfite, sodium thiosulfate, azoisbutyramidine dihydrochloride, and azoisobutyrimidazoline dihydrochloride.

Adding amounts of ammonium persulfate, potassium persulfate, sodium hydrogen sulfite, sodium thiosulfate, azoisbutyramidine dihydrochloride, and azoisobutyrimidazoline dihydrochloride by mass may respectively 0.001-0.0045%, 0.001-0.005%, 0.001-0.006%, 0.001-0.005%, 0.001-0.006%, and 0.001-0.004% of an adding amount of acrylamide by mass, and may particularly be 0.002%, 0.002%, 0.003%, 0.002%, 0.003, and 0.002%, respectively, of the adding amount of acrylamide by mass.

In the reaction of the free radical polymerization reaction, a mass volume concentration of the initiator may be 45-60 mg/L.

In the above preparation method, the functional monomer I is prepared according to a method comprising the following steps:

(1) subjecting 1,3-bis(N,N-dimethyl)-2-propanol and a brominated alkane to a quaternerization reaction to obtain an intermediate product, wherein the brominated alkane has 2-9 carbon atoms; and (2) subjecting the intermediate product and acryloyl chloride to an esterification reaction under an alkaline condition to obtain the functional monomer I.

In the above preparation method, in step (1), the quaternerization reaction is carried out at a temperature of 65-70° C. for 12-48 hours, and ethanol is adopted as a solvent.

In the above method, in step (2), acryloyl chloride is slowly added dropwise under ice water bath;

the alkaline condition is regulated and obtained by using triethylamine;

hydroquinone and dimethylaminopyridine are also added to the reaction system.

The activating polymer provided by the present invention has the effects of increasing viscosity of an aqueous phase while reducing viscosity of crude oil, and can serve both as a displacing agent and a viscosity reducer to realize integration of the two agents. The activating polymer can increase viscosity of an aqueous phase, has a displacement effect, can emulsify and disperse crude oil, and increase fluidity of a mixed phase; the dispersed crude oil continues to interact with crude oil that has not contacted the polymer, and the aqueous phase interacts with the mixed oil phase as well as new oil, by way of which continuous interactions, more crude oil can be constantly produced. The activating polymer of the present invention realizes a relatively low interfacial tension and exhibits a certain degree of oil washing capability. The activating polymer of the present invention has good profile control ability, and the dispersed emulsified oil per se has profound profile control and displacement effects.

When the concentration of the activating polymer of the present invention is 400-3000 mg/L, the viscosity thereof is 20-40 mPa·s; the shear viscosity retention rate is 50-80%; the viscosity retention rate after 90-day aging is 40-60%; the activating polymer has good salt resistance; the salinity is between 10000-20000 mg/L; the viscosity reducing rate of the flooding system of the activating water polymer is less than 5%; the oil-water interfacial tension is $0.1\text{-}1\times10^{-1}$ mN/m. For heavy oil having a viscosity of below 1500 mPa·s, it has a viscosity reducing rate of 80-95%. The oil-to-water volume ratio between the activating polymer and the heavy oil is less than 9:1, which basically means formation of an oil-in-water emulsion.

The activating polymer of the present invention is suitable for use in an oilfield reservoir stratum having a crude oil viscosity of 1-1500 mPa·s, and having a permeability difference of 0.1-10 D. The activating polymer can be used according to the following steps.

While the oilfield is being mined or when a water content of a liquid produced under water flooding is 0-80%, an activating water displacing oil system is injected by an injection pump in a pressurized manner. Specifically, dry power of the activating polymer is first dissolved with injection water to prepare a high concentration mother solution, and then the mother solution is diluted to obtain the activating water displacing oil system of a target concentration, and then the activating water displacing oil system is injected, by an injection pump in a pressurized manner, from an injection well into a target oil layer according to a predetermined daily injection volume per single well.

The concentration of the mother solution is 4000-5000 mg/L, and the target concentration is 400-3000 mg/L.

The daily injection volume per single well is 200-3000 $m^3$.

Compared with conventional polymers and high-viscosity polymers, the polymer of the present invention can increase oil production by 10-20%.

DETAILED DESCRIPTION OF THE EMBODIMENTS

Experimental methods used in the following examples are conventional methods unless otherwise specified.

Materials, reagents and the like used in the following examples are commercially available unless otherwise specified.

Example 1

1. Preparation of an Activating Polymer

The activating polymer represented by Formula (1) was specifically prepared by the following method.

First, functional monomer I was prepared by the following steps.

14.6 g (0.1 mol) of 1,3-bis(N,N-dimethyl)-2-propanol and 42.5 g (0.22 mol) of bromooctane in ethanol solution were placed in a 250-ml three-necked flask, stirred magnetically, and condensed under reflux at 65-70° C. for a reaction for 24 hours. The resultant solution was subjected to vacuum rotary evaporation at 50° C. to remove the solvent, followed by an addition of an appropriate amount of acetone, heated and dissolved. After the resultant solution was cooled, a white solid was precipitated with diethyl ether to obtain product I. The product was recrystallized three times with acetone-diethyl ether to give a white solid. The yield was greater than 95%. 26.6 g (0.05 mol) of product I in anhydrous chloroform solution was poured into a 250-ml three-necked flask, followed by a dropwise addition of 6.06 g (0.06 mol) of triethylamine in chloroform solution, and an addition of a small amount of hydroquinone and dimethylaminopyridine (DMAP), and stirred, followed by slowly adding 5.43 g (0.06 mol) of acryloyl chloride under ice water bath. The resultant solution was allowed to stand at room temperature overnight, stirred at 40° C. for 48 hours, and then subjected to vacuum rotary evaporation at room temperature to remove the solvent, followed by an addition of acetone and dissolved, and filtered to remove the insoluble substance to obtain a filtrate. Diethyl ether was added to the filtrate to precipitate a solid. The solid was repeatedly recrystallized three times with a mixed solvent of acetone and diethyl ether to give a white functional monomer I of 14.6 g. The yield was 49.8%.

Figure 1:
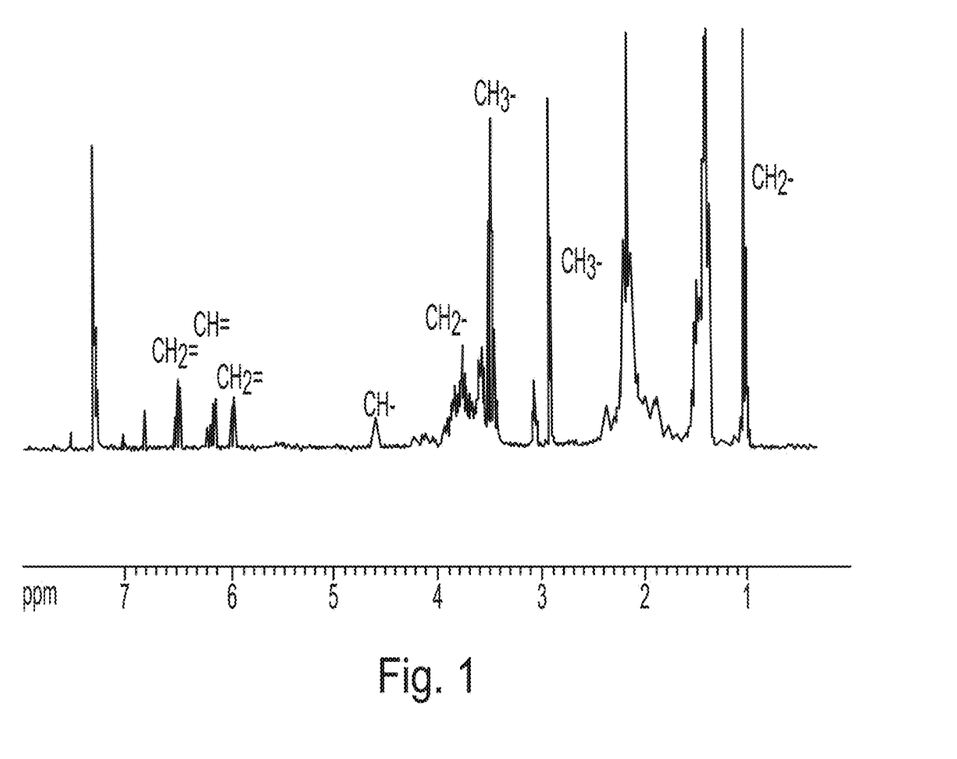
FIG. 1 is a nuclear magnetic spectra representative of structure of a functional monomer I.

Structure of functional monomer I was represented using a nuclear magnetic spectra (FIG. 1): $^1$H NMR (400 MHz, CDCl$_3$): δ0.87 (6H, t, —CH$_2$—CH$_3$), 1.26-1.34 (20H, m, —(CH$_2$)$_5$—), 1.74-1.80 (4H, m, —N—CH$_2$—CH$_2$), 3.42-3.50 (12H, d, N—(CH$_3$)$_2$), 3.56 (4H, m, N—CH$_2$—), 4.63-4.69 (2H, m, N—CH$_2$—CH), 4.87 (2H, d, N—CH$_2$—CH), 5.99 (1H, d, CH$_2$=CH—), 6.16-6.26 (1H, q, CH$_2$=CH—), 6.37 (1H, m, O—CH—), 6.89-6.93 (1H, d, CH$_2$=CH—).

Then, an activating polymer was prepared by the following steps.

According to a formulation of a polymerization reaction solution, acrylamide, functional monomer I, functional monomer II, and functional monomer III were added into a reaction kettle, and stirred until they were completely dissolved. Adding amounts of functional monomer I, functional monomer II, and functional monomer III were 0.04 wt %, 0.04 wt %, and 0.03 wt % of acrylamide, respectively, and a total amount of monomers in the reaction system was 25 wt %. The reaction solution was adjusted with sodium carbonate to have a pH value of 10, and then nitrogen was introduced into the reaction solution for 60 minutes to remove oxygen from the reaction system. The reaction system was cooled to 6-15° C. using an ice brine bath, and then an initiator system was added under the protection of nitrogen. The initiator system was a mixture of ammonium persulfate, potassium persulfate, sodium hydrogen sulfite, sodium thiosulfate, azoisbutyramidine dihydrochloride and azoisobutyrimidazoline dihydrochloride. The components of the mixture were respectively 0.002%, 0.002%, 0.003%, 0.002%, 0.003%, and 0.002% by mass of acrylamide. As reaction heat was continuously released from the reaction, the temperature of the reaction system rose. After the temperature of the reaction system reached a highest point (25~40° C.), the reaction was continued for 3 hours. After the reaction was completed, the gel product in the reaction kettle was granulated, dried, and sieved to obtain a granulated product of an activating polymer oil displacing agent.

Figure 2:
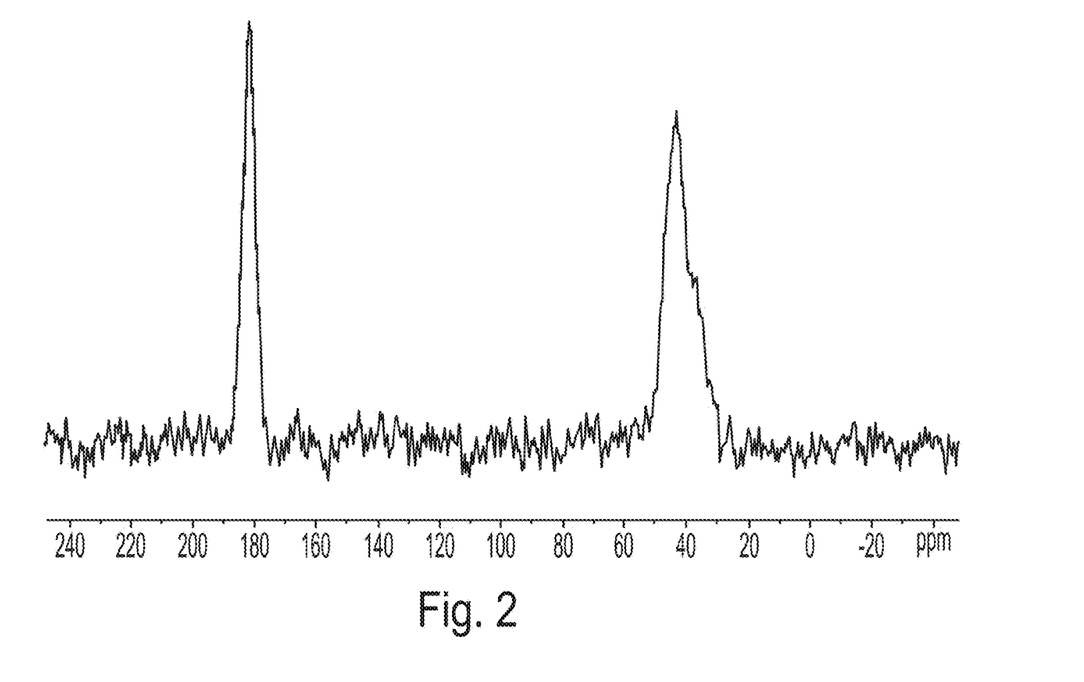
FIG. 2 is a nuclear magnetic spectra representative of an activating polymer.
Figure 3:
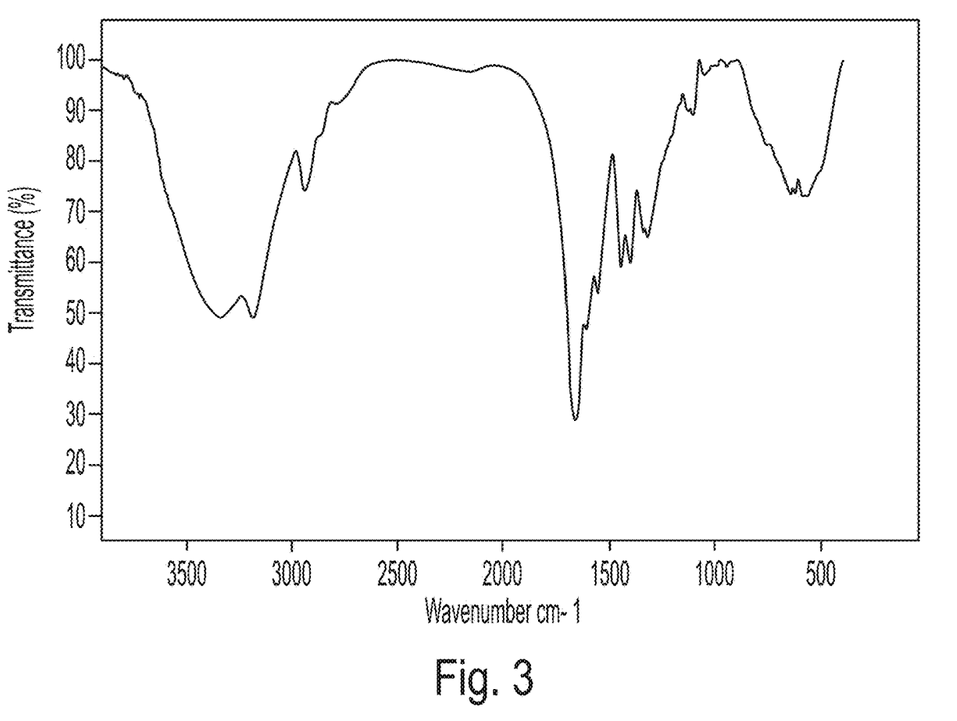
FIG. 3 is an infrared spectra representative of the activating polymer.

A nuclear magnetic spectra and an infrared spectra representative of the activating polymer prepared in this example are shown in FIG. 2 and FIG. 3, respectively. It can be confirmed that the prepared polymer has a correct structure.

The structural formula of the activating polymer prepared in this example is represented by Formula (1), where m is 0.8, y is 0.2, x is 0.005, z is 0.003, and n is 0.002.

2. Application Performance of Activating Water Displacing Oil

A solution was prepared according to the "Technical Criterions of Polymer for Oil Displacement SY/T 5862-2008". Dry powder of the activating polymer was dissolved quickly with injection water to prepare a high concentration mother solution (5000 mg/L). The mother solution was then diluted to obtain an activating water displacing oil with a target concentration. The injection water was simulated mineralized water of an oilfield in Bohai region, and ion composition thereof was: $Na^+ + K^+$ 3091.96, $Ca^{2+}$ 276.17, $Mg^{2+}$ 158.68, $CO_3^{2-}$ 14.21, $HCO_3^-$ 311.48, $SO_4^{2-}$ 85.29, $Cl^-$ 5436.34. In the experiment, the crude oil was crude oil of an oilfield in Bohai region, and viscosity of the formation was 400 mPa·s (at 65° C.).

(1) Viscosity-Concentration Relationship

Figure 4:
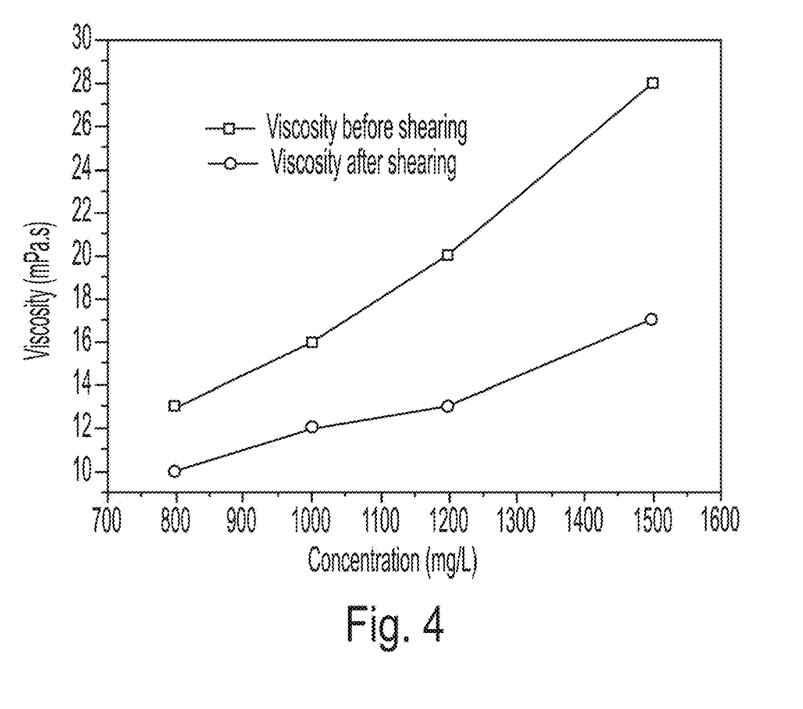
FIG. 4 is a graph showing viscosity and concentration of an activating water displacing oil.
Figure 5:
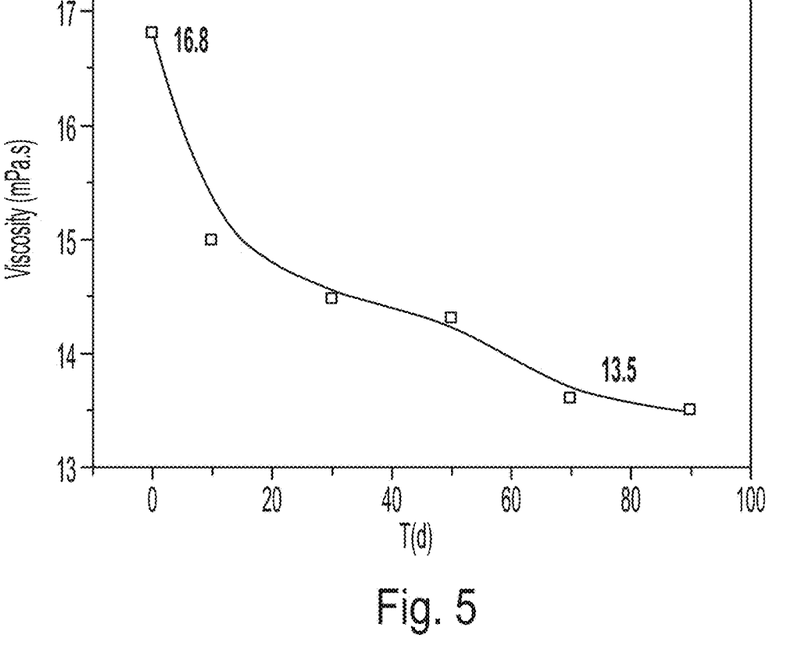
FIG. 5 is a graph showing long-term stability of the activating water displacing oil.

BROOKFIELD DV-III was used for viscosity testing before and after shearing. Shearing was performed using a Waring blender. Standards for the shearing were that the shearing strength was set in the first gear, and that the shearing was performed for 20 seconds. The rotation speed was set to 6 r/min (7.34 $s^{-1}$) for an apparent viscosity test. The test temperature was 65° C. A viscosity-concentration curve of the activating water displacing oil was obtained (FIG. 4). An activating water displacing oil of 1500 mg/L was prepared, and was stirred for 20 seconds with a Waring blender in the first gear. The apparent viscosity after stirring was measured at 65° C. and a shearing rate of 7.34 $s^{-1}$. The activating water displacing oil was placed in a conical flask, into which nitrogen was then introduced to remove oxygen. The flask was sealed with a plug and placed in a 65° C. incubator. The viscosity of the activating water displacing oil was measured at different time points (FIG. 5). As can be noted from the figure, the viscosity is 28 mPa·s when the concentration is 1500 mg/L; the viscosity after shearing is 16.8 mPa·s; and the viscosity retention rate after shearing is 60%. After 90 days of aging, the viscosity is 13.5 mPa·s, and the viscosity retention rate after aging is 48.2%.

(2) Oil-Water Interfacial Tension

Figure 6:
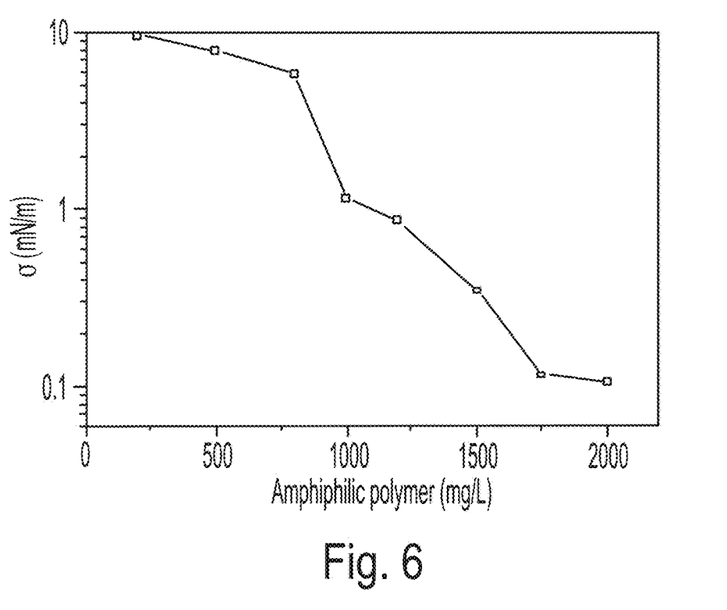
FIG. 6 is a graph showing oil-water interfacial tension of the activating water displacing oil.

The activating polymer can significantly reduce the oil-water interfacial tension, as shown in FIG. 6, to about $10^{-1}$ mN/m. The ability of the activating polymer to reduce the oil-water interfacial tension indicates that it has a good interfacial activity.

(3) Dispersion Performance

A fluorescence microscope was used to observe the dispersion morphology of different concentrations of the activating polymer and a small molecule viscosity reducer (sodium alkyl sulfonate) after their interaction with heavy oil. The oil-water ratio was 1:1. Micrographs of emulsified crude oil are shown in FIG. 7.

Figure 7:
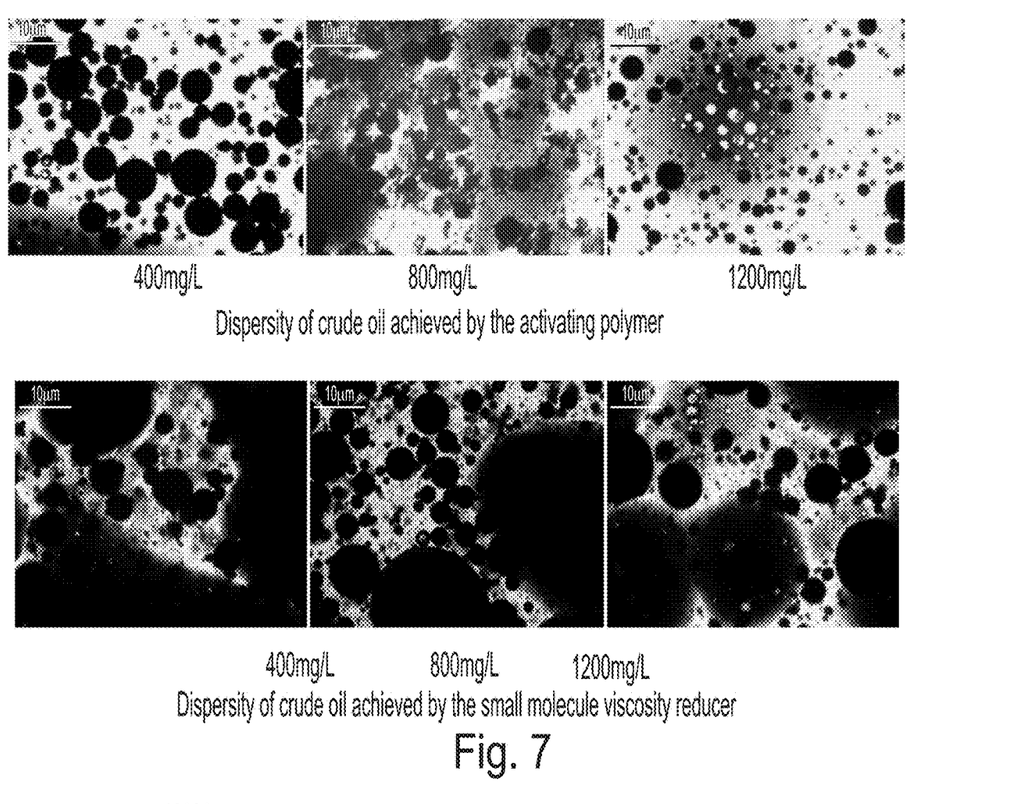
FIG. 7 is a photomicrograph showing emulsification of crude oil by the activating polymer.

As can be noted from FIG. 7, the small molecule surfactant, at a low concentration, has a weak ability to emulsify heavy oil. Compared with the small molecule viscosity reducer, the activating polymer solution, at a concentration of as low as 400 mg/L, can significantly emulsify and disperse heavy oil. When the concentration of the activating polymer solution is higher, emulsified and dispersed oil droplets have smaller particle sizes. The micro-dispersed phase has a very wide size distribution range from a few hundred nanometers (the lower limit that can be observed) to a few dozen micrometers, and a small number of microphases have larger sizes.

(4) Viscosity Reducing Performance

Different concentrations of activating polymer solutions were prepared. The heavy oil to be tested and the activating polymer solution were mixed at a ratio of oil to water of 1:1, and kept at a constant temperature of 65° C. for 1 hour. The resultant mixture was mechanically stirred for 1 minute (600 r/min). The viscosity test was quickly carried out at 65° C. using BROOKFIELD DV-III. Results are shown in FIG. 8.

Figure 8:
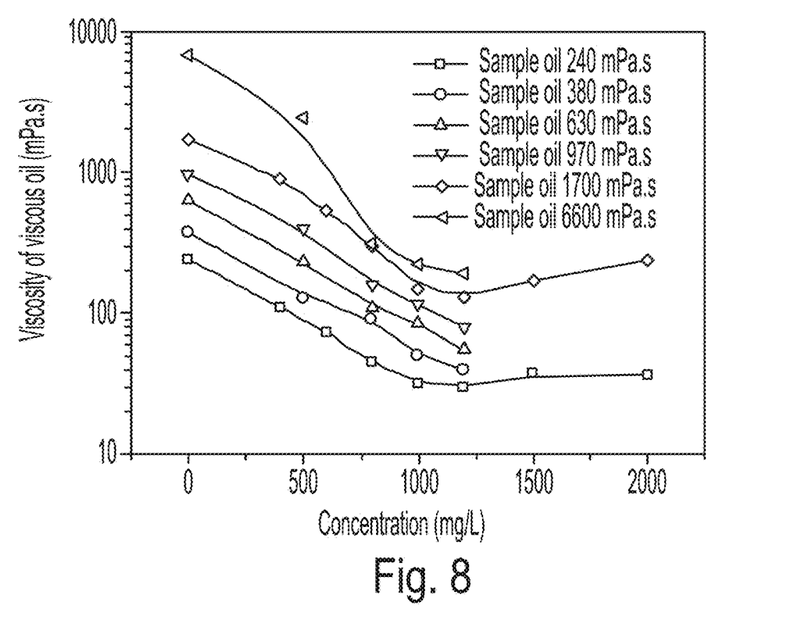
FIG. 8 is a graph showing viscosity-reducing effects of different concentrations of activating polymer on heavy oil (data used for the viscosity test: record a relatively stable viscosity value of each of mixed phases).

It can be noted from FIG. 8 that the activating polymer has a good viscosity reducing effect on heavy oils of different viscosities, and the activating polymer solution at a concentration as low as 500 mg/L has a viscosity reducing rate for heavy oil of more than 50%. When the concentration of the activating polymer is 1000 mg/L, its viscosity reducing rate exceeds 90%. However, when the concentration of the activating polymer is increased to 1500 mg/L, its viscosity reducing rate is decreased slightly. The viscosity reduction of heavy oil by the activating polymer is in essence viscosity reduction by emulsification.

3. Oilfield On-Site Example of Enhanced Oil Production by Activating Water Displacing Oil An inland oilfield in China was selected as a target oilfield to carry out on-site test of enhanced oil production by activating water flooding. Steps are as follows. First, dry powder of the activating polymer was quickly dissolved with injection water to prepare a high concentration mother solution. The mother solution was diluted to obtain an activating water displacing oil system of a target concentration. The activating water displacing oil system was then injected, by an injection pump in a pressurized manner, from an injection well into a target oil layer according to a predetermined daily injection volume per single well. The injection volume per single well was 2000 $m^3$/d, and the polymer concentration was 400-800 mg/L.

Conditions of a test block are shown in Table 1.

TABLE 1

| Conditions of the Test Block | |
|---|---|
| Well spacing | 100 m |
| Injection well | 3 injection wells (4-4/6/12 well) |
| Well pattern | Inverted seven-spot |
| Underground crude oil viscosity | 1170 mPa · s on average |
| Asphaltene content | 39.10% |
| Permeability | (54.3-800.7) × $10^{-3}$ D |
| Oil layer thickness | 5-21 m |
| Temperature | 35° C. |
| Salinity of formation water | 24100-33000 mg/L |
| Calcium and magnesium ions | 96.4-163 mg/L, 88.4-120 mg/L |

TABLE 1-continued

| Conditions of the Test Block | |
|---|---|
| Injection time | 2011.8 |
| Injection concentration | 800 mg/L, 400 mg/L |

The activating polymer for heavy oil achieved significant oil-increasing effect at the tested oilfield. With respect to the oil production increase, the monthly oil production volume was 240 cubic meters before the injection of activator, and after the injection of activator, the monthly oil production was 1200 cubic meters in October 2011, reaching a production peak. By Oct. 14, 2013, the cumulative oil production increase was 7982 cubic meters, and each ton of the activator increased the oil production by 106 cubic meters.

INDUSTRIAL APPLICATION

The present invention has the following beneficial effects.

The activating polymer provided by the present invention has effects of simultaneously increasing the viscosity of the aqueous phase and reducing the viscosity of the crude oil, and can serve both as a displacing agent and a viscosity reducer to realize the integration of the two agents. The activating polymer can increase the viscosity of the aqueous phase, has a displacement effect, can emulsify and disperse the crude oil, and increase the fluidity of the mixed phase; the dispersed crude oil continues to interact with the crude oil that has not yet contacted the agent, and meanwhile the aqueous phase interacts not only with the mixed oil phase but also with new oil, by way of which continuous interactions, more crude oil can be constantly produced. The activating polymer of the present invention has a low interfacial tension and exhibits a certain degree of oil washing capability. The activated polymer of the invention has good profile control ability, and the dispersed emulsified oil has the function of deep profile control and displacement.

The invention claimed is:

1. A polymer of dispersing agent having a structural formula shown in Formula (1):

(Formula 1)

wherein, in Formula (1), x, y, z, m, and n are respectively mass fractions of corresponding chain segments in the polymer, m being 0.75-0.85, y being 0.20-0.24, and x, z, and n all being 0.001-0.01; and
p is a natural number between 2 and 9.

2. A preparation method of the polymer according to claim 1, comprising the following steps:
subjecting acrylamide, a functional monomer I, a functional monomer II, and a functional monomer III to a free radical polymerization reaction in an inert atmosphere, in presence of an initiator, and under an alkaline condition, to obtain the polymer, wherein
the functional monomer I has a structural formula as shown in Formula (2),

Formula (2)

wherein in Formula (2), p is a natural number between 2 and 9;
the functional monomer II has a structural formula as shown in Formula (3); and Formula (3)

the functional monomer III has a structural formula as shown in Formula (4);

Formula (4)

3. The preparation method according to claim 2, wherein the method is carried out according to the following steps:
adding acrylamide, the functional monomer I, the functional monomer II, and the functional monomer III to water to obtain a reaction solution, adjusting a pH value of the reaction solution, and then introducing nitrogen into the reaction solution; lowering temperature of the reaction solution using an ice brine bath, and then adding the initiator to carry out the free radical polymerization reaction; wherein heat released by the free radical polymerization reaction raises the temperature of the reaction system, and after the temperature of the reaction system reaches a highest point, the free radical polymerization reaction is continued for 2-6 hours.

4. The preparation method according to claim 3, wherein the pH value is adjusted to 7-11 by using sodium carbonate; the temperature of the reaction solution is lowered to 6-15° C. using the ice brine bath; and the highest temperature reached by the reaction system is 25-40° C.

5. The preparation method according to claim 2, wherein, adding amounts of the functional monomer I, the functional monomer II, and the functional monomer III by mass are respectively 0.02-0.2%, 0.02-0.4%, and 0.01-0.5% of an adding amount of acrylamide by mass; and in the system of the free radical polymerization reaction, a total mass concentration of the reactive monomers is 25-30%, the total mass concentration of the monomers referring to a sum total of acrylamide, the functional monomer I, the function monomer II, and the functional monomer III.

6. The preparation method according to claim 2, wherein, the initiator is a mixture of ammonium persulfate, potassium persulfate, sodium hydrogen sulfite, sodium thiosulfate, azoisbutyramidine dihydrochloride, and azoisobutyrimidazoline dihydrochloride;

adding amounts of ammonium persulfate, potassium persulfate, sodium hydrogen sulfite, sodium thiosulfate, azoisbutyramidine dihydrochloride, and azoisobutyrimidazoline dihydrochloride by mass are respectively 0.001-0.0045%, 0.001-0.005%, 0.001-0.006%, 0.001-0.005%, 0.001-0.006%, and 0.001-0.004% of an adding amount of acrylamide by mass; and in the system of the free radical polymerization reaction, a mass volume concentration of the initiator is 45-60 mg/L.

7. The preparation method according to claim 2, wherein, the functional monomer I is prepared according to a method comprising the following steps:

(1) subjecting 1,3-bis(N,N-dimethyl)-2-propanol and a brominated alkane to a quaternerization reaction to obtain an intermediate product, wherein the brominated alkane has 2-9 carbon atoms; and (2) subjecting the intermediate product and acryloyl chloride to an esterification reaction under an alkaline condition to obtain the functional monomer I.

8. The preparation method according to claim 7, wherein, in step (1), the quaternerization reaction is carried out at a temperature of 65-70° C. for 12-48 hours;

in step (2), the alkane condition is regulated and obtained by using triethylamine; and hydroquinone and dimethylaminopyridine are also added to the reaction system.

9. A polymeric displacing agent, having an active ingredient which is the polymer of claim 1.

10. A method for improving oil production at an oilfield, comprising the following steps:

injecting an oil displacement system while the oilfield is being mined or when a water content of a liquid produced under water flooding is 0-80%, wherein the oil displacement system is an aqueous solution of the polymer of claim 1.

11. The method according to claim 10, wherein, an oil reservoir of the oilfield is an oilfield reservoir stratum having a crude oil viscosity of 1-1500 mPa·s, and having a permeability difference of 0.1-10 D.

12. The method according to claim 10, wherein, the oil displacement system is injected by an injection pump in a pressurized manner specifically according to the following steps:

preparing the polymer first into a mother solution using injection water, and then diluting the mother solution into the oil displacement system of a target concentration, and then injecting the oil displacement system from an injection well to a target oil layer by the injection pump in a pressurized manner.

13. The method according to claim 12, wherein, the mother solution has a concentration of 4000-5000 mg/L, and in the oil displacement system, the polymer has a concentration of 400-3000 mg/L.

* * * * *